United States Patent
Lee et al.

(10) Patent No.: US 11,038,588 B1
(45) Date of Patent: Jun. 15, 2021

(54) FAILURE PREDICTION METHOD OF OPTICAL TRANSCEIVER AND RELATED OPTICAL TRANSCEIVER AND FIBER-OPTIC COMMUNICATION SYSTEM

(71) Applicant: Moxa Inc., New Taipei (TW)

(72) Inventors: Yueh-Ju Lee, New Taipei (TW);
Shu-Hsien Liu, New Taipei (TW);
Ching-Ping Wu, New Taipei (TW);
Shao-Hua Li, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 16/865,414

(22) Filed: May 3, 2020

(30) Foreign Application Priority Data

Apr. 10, 2020 (TW) .................... 109112164

(51) Int. Cl.
| | | |
|---|---|---|
| *H04B 10/079* | (2013.01) | |
| *H04B 10/50* | (2013.01) | |
| *H04B 10/40* | (2013.01) | |
| *H04B 10/25* | (2013.01) | |
| *H05B 47/20* | (2020.01) | |
| *H04B 10/69* | (2013.01) | |
| *H05B 47/135* | (2020.01) | |
| *H04B 10/564* | (2013.01) | |

(52) U.S. Cl.
CPC ....... *H04B 10/07955* (2013.01); *H04B 10/25* (2013.01); *H04B 10/40* (2013.01); *H04B 10/50* (2013.01); *H04B 10/564* (2013.01); *H04B 10/69* (2013.01); *H05B 47/135* (2020.01); *H05B 47/20* (2020.01)

(58) Field of Classification Search
CPC .................................................... H05B 47/20
USPC ....................... 398/9–38, 201, 212
See application file for complete search history.

(56) References Cited

U.S. PATENT DOCUMENTS

| | | | | |
|---|---|---|---|---|
| 5,019,769 | A * | 5/1991 | Levinson ............. | H01S 5/0683 372/31 |
| 5,594,748 | A * | 1/1997 | Jabr .................... | H01S 5/06825 372/38.07 |
| 10,050,713 | B2 | 8/2018 | Li | |
| 10,425,156 | B1 * | 9/2019 | Zeng ................ | H04B 10/07955 |

(Continued)

FOREIGN PATENT DOCUMENTS

| | | |
|---|---|---|
| CN | 206542410 U | 10/2017 |
| EP | 1 330 054 A2 | 7/2003 |

(Continued)

*Primary Examiner* — Li Liu
(74) *Attorney, Agent, or Firm* — Winston Hsu

(57) ABSTRACT

When performing failure prediction on an optical transceiver, the output optical power and an operational current of a transmission optical sub-assembly in the optical transceiver are recorded during the operation of the optical transceiver. A first ratio is acquired by dividing the average slope of the operational current recorded at a current time period by the average slope of the operational current recorded at an earlier time period. A second ratio is acquired by dividing the absolute average value of the slope of the output optical power recorded at the earlier time period by the absolute average value of the slope of the output optical power recorded at the current time period. When it is determined that the product of the first ratio and the second ratio is greater than a threshold value, a failure notification including life prediction information is provided.

6 Claims, 3 Drawing Sheets

(56) References Cited

U.S. PATENT DOCUMENTS

| | | | |
|---|---|---|---|
| 10,461,851 B1* | 10/2019 | Zeng | H04B 10/0791 |
| 2002/0149821 A1* | 10/2002 | Aronson | G01M 99/002 |
| | | | 398/135 |
| 2004/0022543 A1* | 2/2004 | Hosking | H04B 10/40 |
| | | | 398/135 |
| 2004/0131094 A1* | 7/2004 | Miremadi | H01S 5/0687 |
| | | | 372/29.02 |
| 2004/0197101 A1* | 10/2004 | Sasser | H04B 10/6911 |
| | | | 398/117 |
| 2005/0031352 A1* | 2/2005 | Light | H04B 10/50 |
| | | | 398/135 |
| 2005/0031357 A1* | 2/2005 | Soto | H04B 10/40 |
| | | | 398/198 |
| 2005/0058455 A1* | 3/2005 | Aronson | H04B 10/43 |
| | | | 398/135 |
| 2006/0159461 A1* | 7/2006 | Nelson | H04B 10/40 |
| | | | 398/135 |
| 2006/0216040 A1* | 9/2006 | Nelson | H04B 10/564 |
| | | | 398/186 |
| 2007/0196104 A1* | 8/2007 | Nelson | H04B 10/0799 |
| | | | 398/25 |
| 2009/0192735 A1* | 7/2009 | Horiuchi | H01S 5/0021 |
| | | | 702/58 |
| 2020/0381889 A1* | 12/2020 | Suehiro | H04B 10/075 |

FOREIGN PATENT DOCUMENTS

| | | | |
|---|---|---|---|
| JP | 09116231 A | * | 5/1997 |
| JP | 2014-212234 A | | 11/2014 |
| JP | 2016-163106 A | | 9/2016 |
| JP | 2016163106 A | * | 9/2016 |
| JP | 6512232 | | 5/2019 |
| WO | 03/046614 A2 | | 6/2003 |

* cited by examiner

FAILURE PREDICTION METHOD OF OPTICAL TRANSCEIVER AND RELATED OPTICAL TRANSCEIVER AND FIBER-OPTIC COMMUNICATION SYSTEM

CROSS REFERENCE TO RELATED APPLICATION

This application claims priority of Taiwan Application No. 109112164 filed on 2020 Apr. 10.

BACKGROUND OF THE INVENTION

1. Field of the Invention

The present invention is related to a failure prediction method of optical transceiver and related optical transceiver and fiber-optic communication system, and more particularly, to a method of performing failure prediction on optical transceiver according to operational current and output optical power of lighting device and related optical transceiver and fiber-optic communication system.

2. Description of the Prior Art

Fiber-optic communication has revolutionized the telecommunications industry and the data networking community. Using optical fibers to transmit optical signals from one place to another, fiber-optic communications have enabled telecommunications links to be made over much greater distances, with much higher data rates and with higher security. As a result of these advantages, fiber-optic communication systems are widely employed for applications ranging from major telecommunications backbone infrastructure to Ethernet systems, broadband distribution, and general data networking.

Among various types of fiber-optic communication systems, there are typically three major components: optical fibers and optical cables made thereof, active optical devices, and passive optical devices. In the structure of a fiber-optic communication system, an optical transceiver is an active optical device configured to integrate the function of a transmitter and a receiver. An electrical-to-optical transceiver at the transmitting end is able to generate optical signals from electrical signals for subsequent data transmission. A corresponding optical-to-electrical transceiver at the receiving end is able to convert the optical signals received from the transceiver into the original electrical signals.

An optical transceiver normally adopts laser diodes (LDs) or light-emitting diodes (LEDs) as lighting devices for providing optical signals. Since the operational efficiency of the lighting devices affects the electrical-to-optical conversion efficiency, there is a need for a method of performing failure prediction on optical transceivers.

SUMMARY OF THE INVENTION

The present invention provides a method of performing failure prediction on an optical transceiver. The method includes recording an output optical power and an operational current associated with a TOSA in the optical transceiver during an operational period of the optical transceiver, acquiring a first average slope of the operational current and a second average slope of the output optical power which are recorded during a first time period, acquiring a third average slope of the operational current and a fourth average slope of the output optical power which are recorded during a second time period, calculating a first ratio by dividing the third average slope by the first average slope, calculating a second ratio by dividing an absolute value of the second average slope by an absolute value of the fourth average slope, and sending a failure advance notice when determining that a product of the first ratio and the second ratio is larger than a threshold value. The first time period and the second time period correspond to a same environmental temperature. The first time period is a reference time period which occurs earlier than the second time period.

The present invention also provides an optical transceiver which includes a TOSA, a notification alert unit, and an intelligent monitoring module. The TOSA includes a lighting device and configured to convert an electrical signal into an optical signal. The notification alert unit is configured to send a failure advance notice. The intelligent monitoring module includes a monitor circuit and a computation control unit. The monitor circuit is configured to record an output optical power and an operational temperature of the lighting device during the operational period of the optical transceiver. The computation control unit is configured to acquire a first average slope of the operational current and a second average slope of the output optical power which are recorded during a first time period, acquire a third average slope of the operational current and a fourth average slope of the output optical power which are recorded during a second time period, calculate a first ratio by dividing the third average slope by the first average slope, calculate a second ratio by dividing an absolute value of the second average slope by an absolute value of the fourth average slope, and instruct the notification alert unit to send the failure advance notice when determining that a product of the first ratio and the second ratio is larger than a threshold value. The first time period and the second time period correspond to a same environmental temperature. The first time period is a reference time period which occurs earlier than the second time period.

The present invention also provides a fiber-optical communication system which includes a first optical transceiver, a second optical transceiver, a first optical fiber and a second optical fiber. The first optical transceiver includes a first TOSA, a first ROSA, a first notification alert unit, and a first intelligent monitoring module. The second optical transceiver includes a second TOSA, a second ROSA, a second notification alert unit, and a second intelligent monitoring module. The first TOSA includes a first lighting device and configured to convert a first electrical signal into a first optical signal. The first ROSA includes a first photo detector and configured to convert a second optical signal into a second electrical signal. The first notification alert unit is configured to send a first failure advance notice. The first intelligent monitoring module includes a first monitor circuit and a first computation control unit. The first monitor circuit is configured to record a first output optical power and a first operational current of the first lighting device during the operational period of the first optical transceiver. The first computation control unit is configured to acquire a first average slope of the first operational current and a second average slope of the first output optical power which are recorded during a first time period, acquire a third average slope of the first operational current and a fourth average slope of the first output optical power which are recorded during a second time period, calculate a first ratio by dividing the third average slope by the first average slope, calculate a second ratio by dividing an absolute value of the second average slope by an absolute value of the fourth average slope, and instruct the first notification alert unit to send the first failure advance notice when determining that a product of the first ratio and the second ratio is larger than a first threshold value, wherein the first time period and the second time period correspond to a same environmental temperature, and the first time period is a first reference time period which occurs earlier than the second time period. The second TOSA includes a second lighting device and configured to convert a third electrical signal into the second optical signal. The second ROSA includes a second photo detector and configured to convert the first optical signal into a fourth electrical signal. The second notification alert unit is configured to send a second failure advance notice. The second intelligent monitoring module includes a second monitor circuit and a second computation control unit. The second monitor circuit is configured to record a second output optical power and a second operational current of the second lighting device during the operational period of the second optical transceiver. The second computation control unit is configured to acquire a fifth average slope of the second operational current and a sixth average slope of the second output optical power which are recorded during a third time period, acquire a seventh average slope of the second operational current and an eighth average slope of the second output optical power which are recorded during a fourth time period, calculate a third ratio by dividing the seventh average slope by the fifth average slope, calculate a fourth ratio by dividing an absolute value of the sixth average slope by an absolute value of the eighth average slope, and instruct the second notification alert unit to send the second failure advance notice when determining that a product of the third ratio and the fourth ratio is larger than a second threshold value, wherein the third time period and the fourth time period correspond to the same environmental temperature, and the third time period is a second reference time period which occurs earlier than the fourth time period. The first optical fiber is coupled between the first TOSA and the second ROSA for transmitting the first optical signal. The second optical fiber is coupled between the second TOSA and the first ROSA for transmitting the second optical signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
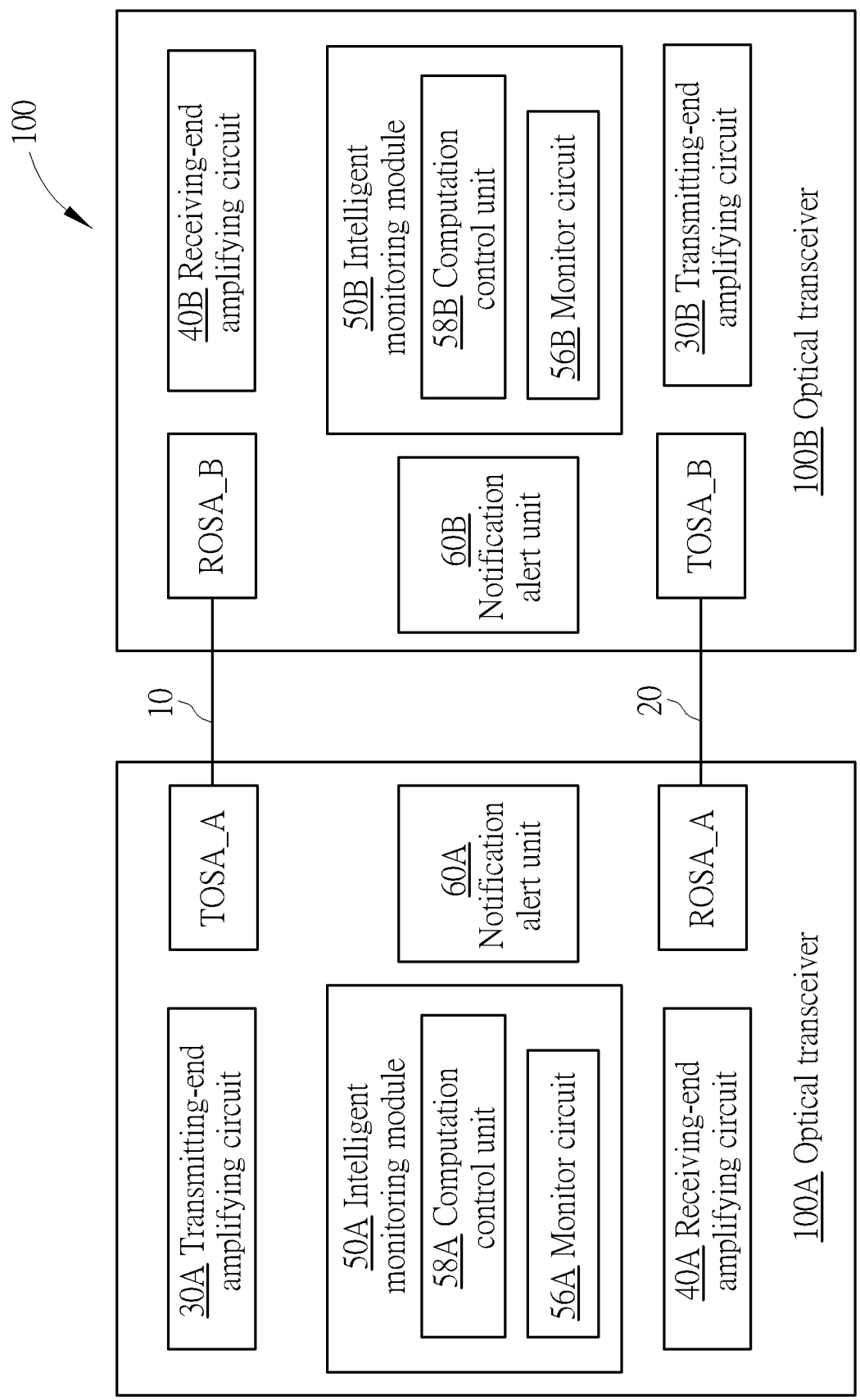
FIG. 1 is a functional diagram illustrating a fiber-optic communication system according to an embodiment of the present invention.

FIG. 1 is a functional diagram illustrating a fiber-optic communication system 100 according to an embodiment of the present invention. The fiber-optic communication system 100 includes a plurality of optical transceivers capable of transmitting optical signals using optical fibers. Each optical transceiver is configured to convert electrical signals into optical signals using electrical-to-optical conversion, and then transmit the optical signals to another optical transceiver using optical fibers. After receiving optical signals from another optical transceiver, each optical transceiver may convert the received optical signals into electrical signals using optical-to-electrical conversion, thereby supplying other electronic equipment. For illustrative purpose, FIG. 1 depicts the embodiment of two optical transceivers. However, the number of optical transceivers in the fiber-optic communication system 100 does not limit the scope of the present invention.

The fiber-optic communication system 100 depicted in FIG. 1 includes an optical transceiver 100A, an optical transceiver 100B, and two optical fibers 10 and 20. The optical transceiver 100A includes a transmission optical sub-assembly (TOSA) TOSA_A, a receiver optical sub-assembly (ROSA) ROSA_A, a transmitting-end amplifying circuit 30A, a receiving-end amplifying circuit 40A, an intelligent monitoring module 50A, and a notification alert unit 60A. The optical transceiver 100B includes a transmission optical sub-assembly TOSA_B, a receiver optical sub-assembly ROSA_B, a transmitting-end amplifying circuit 30B, a receiving-end amplifying circuit 40B, an intelligent monitoring module 50B, and a notification alert unit 60B. The transmission optical sub-assembly TOSA_A of the optical transceiver 100A may transmit optical signals to the receiver optical sub-assembly ROSA_B of the optical transceiver 200 using the optical fiber 10. The transmission optical sub-assembly TOSA_B of the optical transceiver 100B may transmit optical signals to the receiver optical sub-assembly ROSA_A of the optical transceiver 100 using the optical fiber 20.

Each of the transmission optical sub-assemblies TOSA_A and TOSA_B includes lighting devices, photo detectors, optical mirrors and structural devices (not shown in FIG. 1) such as ferrules, sleeves, housings and transistor outline cans (TO-Cans). In the optical transceivers 100A and 100B, the lighting devices in the transmission optical sub-assemblies TOSA_A and TOSA_B can convert electrical signals into optical signals, which are then directed into the corresponding optical fiber by a focusing device for data transmission. In the embodiments of the present invention, the lighting devices in the transmission optical sub-assemblies TOSA_A and TOSA_B may be LDs or LEDs, such as using Fabry-Perot LDs, distributed feedback (DFB) LDs, vertical-cavity surface-emitting laser (VCSEL) diodes, fiber Bragg grating (FBG) LDs, GaAs LEDs or GaAsP LEDs for providing optical signals with various modulations, wavelengths, speeds and output power. However, the types of the lighting devices in the transmission optical sub-assemblies TOSA_A and TOSA_B do not limit the scope of the present invention.

Each of the receiver optical sub-assemblies ROSA_A and ROSA_B includes light-detecting devices, transimpedance amplifier, optical mirrors and structural devices (not shown in FIG. 1) such as ferrules, sleeves, housings and TO-Cans. In the optical transceivers 100A and 100B, optical signals transmitted via the optical fibers may be directed into the light-detecting devices of the receiver optical sub-assemblies ROSA_A and ROSA_B and then converted into electrical signals. In the embodiments of the present invention, the light-detecting devices in the receiver optical sub-assemblies ROSA_A and ROSA_B may be PIN photodiodes, avalanche photodiodes (APD) or metal-semiconductor-metal (MSM) photodiodes. However, the types of the light-detecting devices in the receiver optical sub-assemblies ROSA_A and ROSA_B do not limit the scope of the present invention.

The transmitting-end amplifying circuits 30A and 30B are configured to provide driving signals for operating the lighting devices in the transmission optical sub-assemblies TOSA_A and TOSA_B, respectively. The receiving-end amplifying circuits 40A and 40B are configured to amplify the signals outputted by the light-detecting devices in the receiver optical sub-assemblies ROSA_A and ROSA_B, respectively.

The intelligent monitoring module 50A of the optical transceiver 100A includes a monitor circuit 56A and a computation control unit 58A. The intelligent monitoring module 50B of the optical transceiver 100B includes a monitor circuit 56B and a computation control unit 58B. The monitor circuits 56A and 56B are configured to respectively monitor the status of each device in the optical transceivers 100A and 100B, so that the computation control units 58A and 58B may control the operations of the optical transceivers 100A and 100B, respectively. The above-mentioned monitor functions include temperature monitoring (TOSA temperature and/or the overall temperature of the optical transceiver), power monitoring (TOSA output power and/or ROSA input power), operation status monitoring of lighting device (optical output power and/or operational current). The above-mentioned control functions include activating, deactivating or resetting system, and adjusting the driving signals of the lighting devices in the transmission optical sub-assemblies TOSA_A and TOSA_B. In an embodiment, since the values of temperature sensing elements in the transmission optical sub-assemblies TOSA_A and TOSA_B vary with the temperatures of corresponding lighting devices, the monitor circuits 56A and 56B may monitor the temperatures of corresponding lighting devices according to the current flowing through corresponding temperature sensing elements. Therefore, the computation control units 58A and 58B may activate corresponding thermoelectric cooling modules so as to prevent the output characteristics of the lighting devices from being influenced by temperature variations. In another embodiment, the photo detectors in the transmission optical sub-assemblies TOSA_A and TOSA_B can receive optical signals from the lighting devices and converted the optical signals into current. Therefore, the monitor circuits 56A and 56B may monitor the output power of corresponding lighting devices according to the current flowing through corresponding photo detectors, thereby allowing the computation control units 58A and 58B to maintain stable output when operating an automatic power control (APC) mode.

Figure 2:
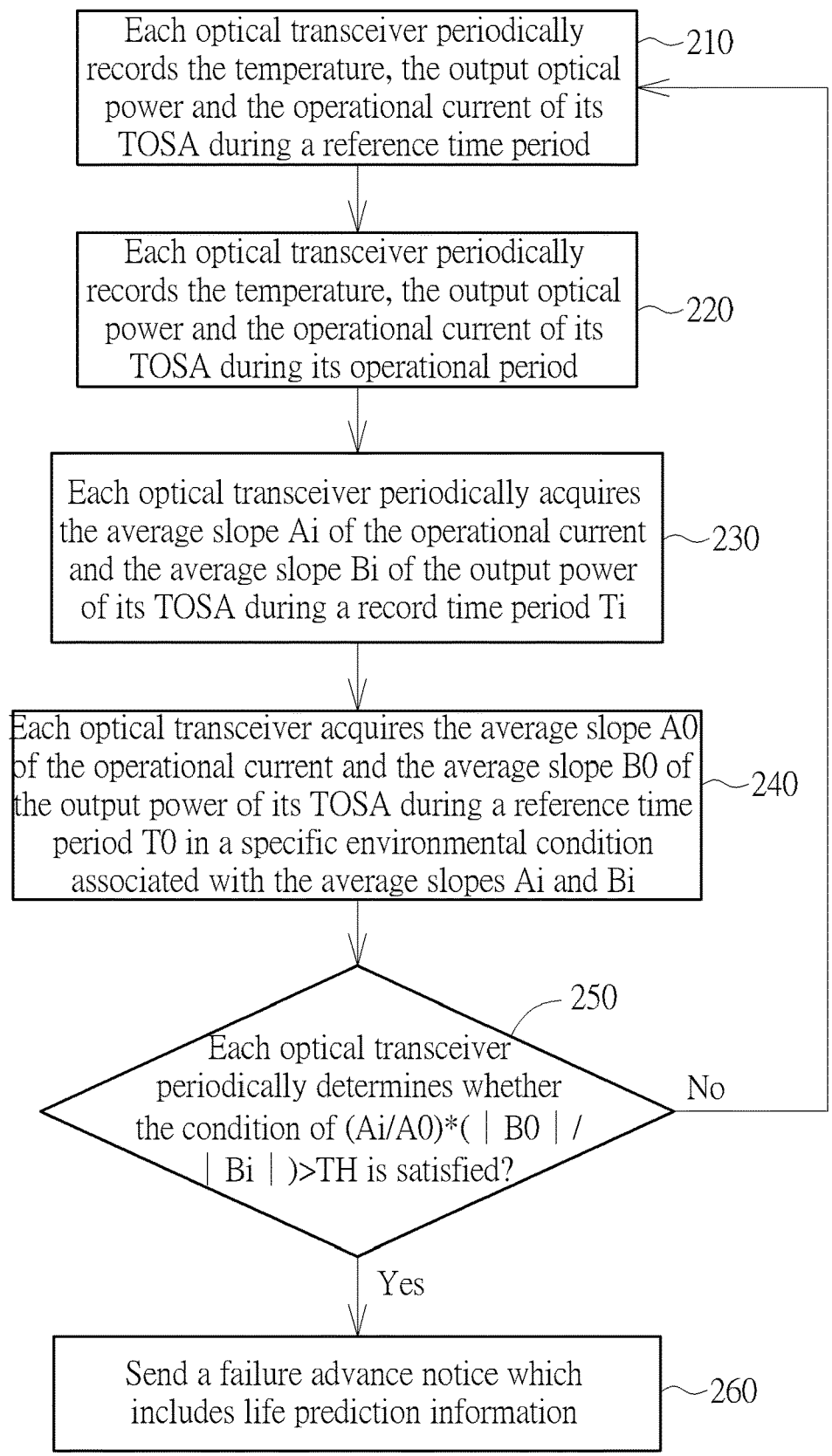
FIG. 2 is a flowchart illustrating a method of performing failure prediction on a fiber-optic communication system according to an embodiment of the present invention.

FIG. 2 is a flowchart illustrating a method of performing failure prediction on the fiber-optic communication system 100 according to an embodiment of the present invention. The flowchart in FIG. 2 includes the following steps:

Step 210: each optical transceiver periodically records the temperature, the output optical power and the operational current of its TOSA during a reference time period.

Step 220: each optical transceiver periodically records the temperature, the output optical power and the operational current of its TOSA during its operational period.

Step 230: each optical transceiver periodically acquires the average slope Ai of the operational current and the average slope Bi of the output power of its TOSA during a record time period Ti.

Step 240: each optical transceiver acquires the average slope A0 of the operational current and the average slope B0 of the output power of its TOSA during a reference time period T0 in a specific environmental condition associated with the average slopes Ai and Bi.

Step 250: each optical transceiver periodically determines whether the condition of $(Ai/A0)*(|B0|/|Bi|)>TH$ is satisfied; if yes, execute step 260; if no, execute step 220.

Step 260: send a failure advance notice which includes life prediction information.

During the initial operational period of the fiber-optic communication system 100, each optical transceiver is configured to periodically record data associated with efficiency degradation of its TOSA during the reference time period in step 210, such as recording the temperature of the lighting device in its TOSA, the output optical power and the operational current. Next in step 220, each optical transceiver is configured to periodically record data associated with efficiency degradation of its TOSA during its operational period, such as recording the temperature of the lighting device in its TOSA, the output optical power and the operational current. As previously stated, the monitor circuit of each transceiver may acquire the temperature of the lighting device according to the current flowing through the temperature sensing element in its TOSA, and acquire the optical output power of the lighting device according to the current flowing through the photo detector in its TOSA, wherein the driving signal outputted by the transmitting-end amplifier circuit to the lighting device is of a known value. Therefore, the monitor circuit in each transceiver can monitor and record the temperature of the lighting device in its TOSA, the output optical power and the operational current at any time.

Based on the data recorded in steps 210 and 220, each optical transceiver is configured to periodically acquire the average slope of the operational current and the average slope of the output power of its TOSA during different time periods in the environmental temperature corresponding to that in which step 220 is executed.

Figure 3:
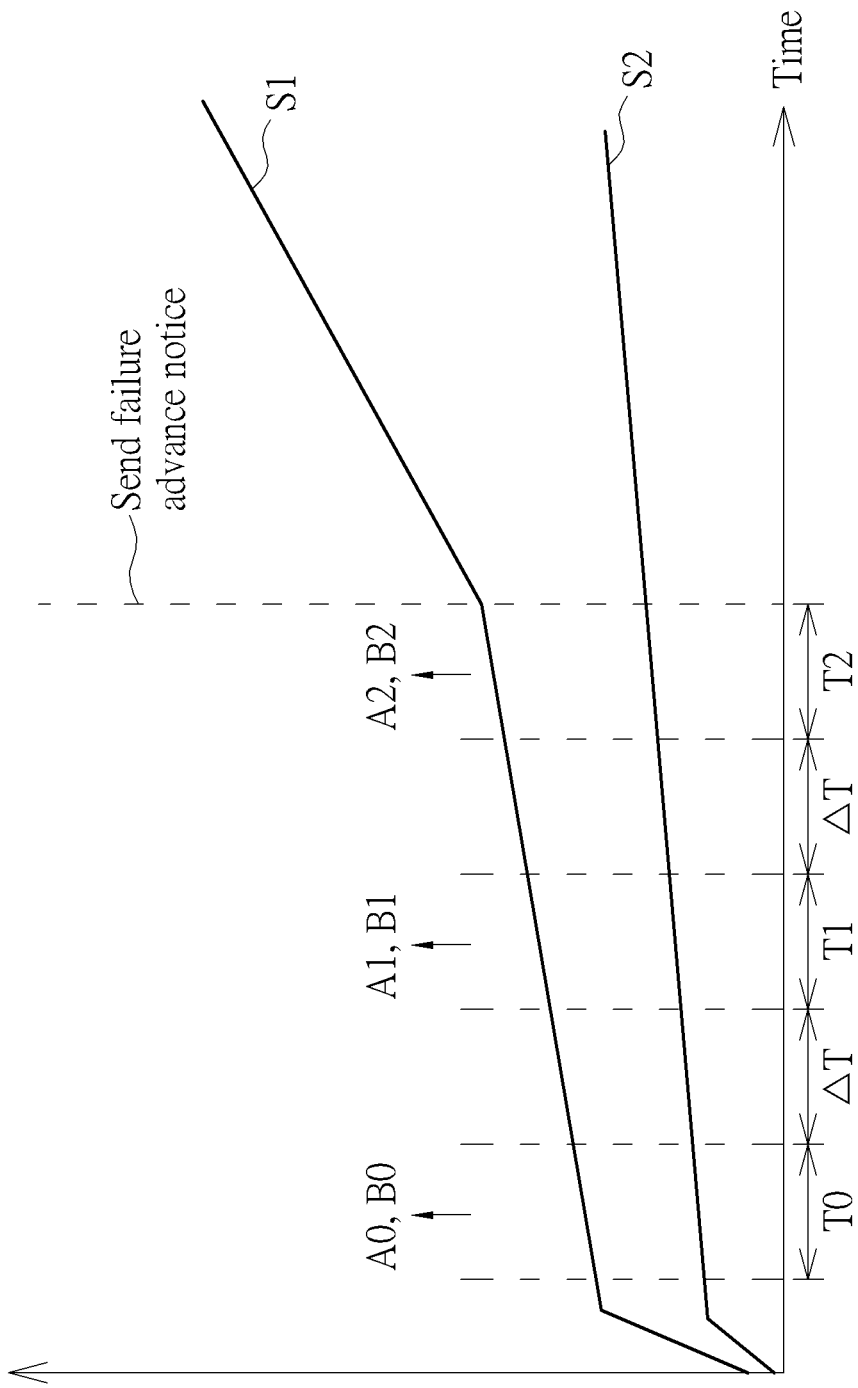
FIG. 3 is a diagram illustrating the operation of a fiber-optic communication system according to an embodiment of the present invention.

FIG. 3 is a diagram illustrating the operation of the fiber-optic communication system 100 when executing steps 230 and 240 according to an embodiment of the present invention. S1 represents the characteristic curve of the TOSA operational current. S2 represents the characteristic curve of the TOSA output power. T0 represents the reference time period, and T1-T4 represent record time periods, wherein two consecutive record time periods is separated by a constant time period ΔT.

In step 230, each optical transceiver is configured to acquire the average slope Ai of the TOSA operational current and the average slope Bi of the TOSA output power after the reference time period at an interval defined by the constant time period ΔT. For example, each optical transceiver is configured to acquire the average slope A1 of the TOSA operational current and the average slope B1 of the TOSA output power during the record time period T1, and acquire the average slope A2 of the TOSA operational current and the average slope B2 of the TOSA output power during the record time period T2.

In step 240, each optical transceiver is configured to acquire the average slope A0 of the TOSA operational current and the average slope B0 of the TOSA output power during the reference time period T0 in the specific environmental condition associated with the average slopes Ai and Bi. The average slope A0 is the average value of the curve S1 during the reference time period T0, and the average slope B0 is the average value of the curve S2 during the reference time period T0.

The failure causes of lighting devices include infant mortality, external hazards and wear-out. The degradation mechanism due to infant mortality is mainly caused by severe defects in manufacturing process. A defective lighting device is likely to include many dark spot defects and dark line defects which largely reduce the optical efficiency of its active area during operation, thereby causing rapid degradation of the lighting device. The degradation mechanism due to external hazards mainly occurs when operating the lighting device in a highly stressed condition (high current, high temperature and/or high power) for a long period of time. For example in a harsh environment or during an intentional accelerated aging test, existing defects in the lighting device may rapidly saturate, thereby causing the lighting device to fail before its guaranteed lifetime. The degradation mechanism due to wear-out is mainly due to the variations in characteristics of the lighting device in a natural aging process. For example, existing defects in the lighting device inevitably saturates as its run time increases, thereby causing its operational current to surge anomalously.

In step 250, each optical transceiver is configured to periodically determine whether the condition of (Ai/A0)*(|B0|/|Bi|)>TH is satisfied. As previously stated, when the optical transceivers 100A and 100B operate in the APC mode, the photo detectors in the transmission optical subassemblies TOSA_A and TOSA_B may provide feedback current associated with the output optical power of corresponding lighting devices. The transmitting-end amplifying circuits 30A and 30B may adjust the operational current of corresponding lighting devices according to the corresponding feedback current so that the transmission optical subassemblies TOSA_A and TOSA_B can maintain stable output. Regardless of the type of failure cause, the operational current of the lighting device will surge anomalously or the optical output power of the lighting device will change in an unpredicted manner when it approaches complete failure. Therefore, the ratio (Ai/A0) associated with the average slope of the operational current and the ratio (|B0|/|Bi|) associated with the absolute value of the average slope of the output optical power are indicative of the probability of complete failure. When it is determined in step 250 that the condition of (Ai/A0)*(|B0|/|Bi|)>TH is satisfied, it indicates that the lighting device may soon reach complete failure. Under such circumstance, the failure advance notice which includes life prediction information may be sent in step 260.

Referring to FIG. 3 for the average slope A1 of the TOSA operational current and the average slope B1 of the TOSA output power during the record time period T1, no failure advance notice is sent if it is determined in step 250 that the condition of (Ai/A0)*(|B0|/|Bi|)>TH is not satisfied. For the average slope A2 of the TOSA operational current and the average slope B2 of the TOSA output power during the record time period T2, the failure advance notice is sent in step 260 after determining in step 250 that the condition of (Ai/A0)*(|B0|/|Bi|)>TH is satisfied. The failure advance notice may also include life prediction information.

In the present invention, the user may manually adjust the sensitivity of failure prediction by setting the value of the threshold value. When operating in the APC mode, the value of (|B0|/|B1|) approaches 1 since the TOSA optical output power is kept at a constant level. Therefore in another embodiment, each optical transceiver may be configured to periodically determine whether the condition of (Ai/A0) >TH is satisfied in step 250.

In the present invention, each optical transceiver may be configured to acquire the life prediction information according to the current operational current of the lighting device, the change in the slope of the operational current and a maximum current limit. The above-mentioned maximum current limit may be determined according to the type of the lighting device and the current operational temperature. When the condition of (Ai/A0)*(|B0|/|Bi|)>TH is satisfied, it can be estimated when the operational current will exceed the maximum current limit based on the value and the slope of the operational current in the current time period, thereby providing the life prediction information accordingly.

In the present invention, when a specific optical transceiver determines that its lighting device may soon reach complete failure, its notification alert unit is instructed to send the failure advance notice which includes life prediction information. The notification alert unit in the specific optical transceiver may send the failure advance notice to other optical transceivers, or to all equipment or systems which use the specific optical transceiver.

In conclusion, in the optical-fiber communication system of the present invention, each optical transceiver is configured to periodically monitor the variation in the slope of its TOSA operation current or in the absolute value of the slope of its TOSA output power.

According to the ratio (Ai/A0) associated with the average slope of the TOSA operational current and the ratio (|B0|/|Bi|) associated with the absolute value of the average slope of the TOSA output optical power, each optical transceiver may send a failure advance notice when the condition of (Ai/A0)*(|B0|/|Bi|)>TH is satisfied. The failure advance notice may also include life prediction information, thereby capable of accurately performing failure prediction on optical transceivers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing failure prediction on an optical transceiver, comprising:
    recording an output optical power and an operational current associated with a transmission optical subassembly (TOSA) in the optical transceiver during an operational period of the optical transceiver;
    acquiring a first average slope of the operational current and a second average slope of the output optical power which are recorded during a first time period;
    acquiring a third average slope of the operational current and a fourth average slope of the output optical power which are recorded during a second time period;
    calculating a first ratio by dividing the third average slope by the first average slope;
    calculating a second ratio by dividing an absolute value of the second average slope by an absolute value of the fourth average slope; and
    sending a failure advance notice when determining that a product of the first ratio and the second ratio is larger than a threshold value, wherein the first time period and the second time period correspond to a same environmental temperature, and the first time period is a reference time period which occurs earlier than the second time period.

2. The method of claim 1, further comprising:
    recording an operational temperature of a lighting device during the operational period of the optical transceiver;
    determining a maximum current limit according to a type of the lighting device and the operational temperature;
    providing a life prediction information according to a value of the operational current during the second time period, the third average slope and the maximum current limit when determining that the product of the first ratio and the second ratio is larger than the threshold value; and sending the failure advance notice which includes the life prediction information.

3. An optical transceiver, comprising:
a transmission optical sub-assembly (TOSA) comprising a lighting device and configured to convert a first electrical signal into a first optical signal;
a notification alert unit configured to send a failure advance notice; and
an intelligent monitoring module, comprising:
  a monitor circuit configured to record an output optical power and an operational temperature of the lighting device during the operational period of the optical transceiver; and
  a computation control unit configured to:
    acquire a first average slope of the operational current and a second average slope of the output optical power which are recorded during a first time period;
    acquire a third average slope of the operational current and a fourth average slope of the output optical power which are recorded during a second time period;
    calculate a first ratio by dividing the third average slope by the first average slope;
    calculate a second ratio by dividing an absolute value of the second average slope by an absolute value of the fourth average slope; and
    instruct the notification alert unit to send the failure advance notice when determining that a product of the first ratio and the second ratio is larger than a threshold value, wherein the first time period and the second time period correspond to a same environmental temperature, and the first time period is a reference time period which occurs earlier than the second time period.

4. The optical transceiver of claim 3, wherein:
the monitor circuit is further configured to record an operational temperature of the lighting device during the operational period of the optical transceiver; and
the computation control unit is further configured to:
  determine a maximum current limit according to a type of the lighting device and the operational temperature;
  provide a life prediction information according to a value of the operational current during the second time period, the third average slope and the maximum current limit when determining that the product of the first ratio and the second ratio is larger than the threshold value; and
  instruct the notification alert unit to send the failure advance notice which includes the life prediction information.

5. A fiber-optical communication system, comprising:
a first optical transceiver, comprising:
  a first transmission optical sub-assembly (TOSA) comprising a first lighting device and configured to convert a first electrical signal into a first optical signal;
  a first receiver optical sub-assembly (ROSA) comprising a first photo detector and configured to convert a second optical signal into a second electrical signal;
  a first notification alert unit configured to send a first failure advance notice; and
  a first intelligent monitoring module, comprising:
    a first monitor circuit configured to record a first output optical power and a first operational current of the first lighting device during the operational period of the first optical transceiver; and
    a first computation control unit configured to:
      acquire a first average slope of the first operational current and a second average slope of the first output optical power which are recorded during a first time period;
      acquire a third average slope of the first operational current and a fourth average slope of the first output optical power which are recorded during a second time period;
      calculate a first ratio by dividing the third average slope by the first average slope;
      calculate a second ratio by dividing an absolute value of the second average slope by an absolute value of the fourth average slope; and
      instruct the first notification alert unit to send the first failure advance notice when determining that a product of the first ratio and the second ratio is larger than a first threshold value, wherein the first time period and the second time period correspond to a same environmental temperature, and the first time period is a first reference time period which occurs earlier than the second time period;
a second optical transceiver, comprising:
  a second TOSA comprising a second lighting device and configured to convert a third electrical signal into the second optical signal;
  a second ROSA comprising a second photo detector and configured to convert the first optical signal into a fourth electrical signal;
  a second notification alert unit configured to send a second failure advance notice; and
  a second intelligent monitoring module, comprising:
    a second monitor circuit configured to record a second output optical power and a second operational current of the second lighting device during the operational period of the second optical transceiver; and
    a second computation control unit configured to:
      acquire a fifth average slope of the second operational current and a sixth average slope of the second output optical power which are recorded during a third time period;
      acquire a seventh average slope of the second operational current and an eighth average slope of the second output optical power which are recorded during a fourth time period;
      calculate a third ratio by dividing the seventh average slope by the fifth average slope;
      calculate a fourth ratio by dividing an absolute value of the sixth average slope by an absolute value of the eighth average slope; and
      instruct the second notification alert unit to send the second failure advance notice when determining that a product of the third ratio and the fourth ratio is larger than a second threshold value, wherein the third time period and the fourth time period correspond to the same environmental temperature, and the third time period is a second reference time period which occurs earlier than the fourth time period;

a first optical fiber coupled between the first TOSA and the second ROSA for transmitting the first optical signal; and a second optical fiber coupled between the second TOSA and the first ROSA for transmitting the second optical signal.

6. The fiber-optical communication system of claim 5, wherein:

the first monitor circuit is further configured to record a first operational temperature of the first lighting device during the operational period of the first optical transceiver; and the first computation control unit is further configured to:

determine a first maximum current limit according to a type of the first lighting device and the first operational temperature;

provide a first life prediction information according to a value of the first operational current during the second time period, the third average slope and the first maximum current limit when determining that the product of the first ratio and the second ratio is larger than the first threshold value; and instruct the first notification alert unit to send the first failure advance notice which includes the first life prediction information;

the second monitor circuit is further configured to record a second operational temperature of the second lighting device during the operational period of the second optical transceiver; and the second computation control unit is further configured to:

determine a second maximum current limit according to a type of the first lighting device and the second operational temperature;

provide a second life prediction information according to a value of the second operational current during the fourth time period, the seventh average slope and the second maximum current limit when determining that the product of the third ratio and the fourth ratio is larger than the second threshold value; and instruct the second notification alert unit to send the second failure advance notice which includes the second life prediction information.

\* \* \* \* \*